Patented Oct. 7, 1952

2,613,206

UNITED STATES PATENT OFFICE 2,613,206

FREE-FLOWING STARCH ESTERS

Carlyle G. Caldwell, Forest Hills, N. Y., assignor to National Starch Products Inc., New York, N. Y., a corporation of Delaware No Drawing. Application December 14, 1949, Serial No. 133,004

5 Claims. (Cl. 260—233.5)

This invention relates to a free-flowing starch derivative.

New starch derivatives have been produced comprising starch acid esters of the substituted dicarboxylic acids represented by the following structural formula:

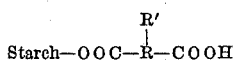

wherein R is a dimethylene or trimethylene radical and R' is the hydrocarbon substituent group which may be alkyl, alkenyl, aralkyl, and aralkenyl. In the copending application of myself and Otto B. Wurzburg, Serial No. 77,296, filed February 18, 1949, a family of such products and the method of their production are described and claimed.

I have now discovered that products characterized by new properties, with important industrial applications, are produced when such starch derivatives, in the form of the ungelatinized starch granules, are reacted with a compound containing a polyvalent metal or a polyvalent alkaline earth metal ion. The reaction is believed to consist in each metal or alkaline earth metal ion replacing the hydrogen atom in each of two or more of the COOH groups on the surface of the granule of the starch derivative. A bivalent metal ion will replace two hydrogens, a trivalent will replace three, a tetravalent will replace four, but, in any case, the result is believed to be a cross-linking or bridging effect around the surface of the starch granule.

The new starch product of my invention may thus be represented by the following structural diagram:

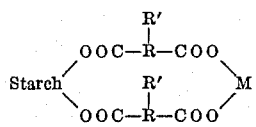

or

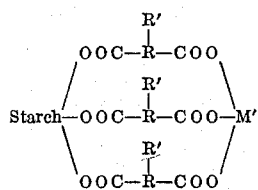

or

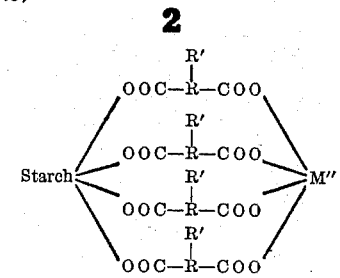

wherein R is the radical and R' the substituent above referred to, and where M, M' and M'' are di-, tri-, and tetravalent metallic or alkaline earth metal ions, respectively.

The product of my invention is characterized particularly by two remarkable properties; firstly, its great increase in ease of flow, in the dry state, and, secondly, its resistance to wetting by water.

Ordinary starches, when commercially dry, do not flow freely but, rather, tend to agglomerate into clumps or cakes. In other words, the individual starch granules tend to stick to one another and agglomerate into larger masses, thus retarding flow and ease of movement. On the other hand, the dry starch derivative of my invention is characterized by such remarkable ease of flow that it is comparable in this respect to a liquid. A quantity of the dry product, placed in a jar and shaken, moves with a liquid motion—whereas an untreated starch falls about in clumped masses. Ordinary untreated starch, when placed in a standard separatory funnel, whose tube is approximately 6 mm. in inner diameter, will not pour through the tube even when the funnel is shaken strongly. On the other hand, a major proportion of the starch product of my invention, under the same conditions, pours quickly from the funnel, even when the funnel is kept absolutely still. This notable free-flowing property is of great importance for many industrial applications, as will be subsequently explained.

The second major advantage of my product is its resistance to wetting with water. This property is combined with another, namely, its susceptibility to wetting (not solution) by organic solvents. Thus, when the powder is poured onto water, it will tend to remain in a dry mass upon the water's surface. Even after mixing with the water, it fails to form a homogeneous suspension, but rises to the top, still dry. On the other hand, the powder will form a relatively homogeneous suspension in organic solvents, such as benzene, xylene, or toluene. If the dry powder is first wetted by a water miscible organic solvent, it may thereafter be mixed with water to form a suspension, and may be cooked to produce a gelatinized, paste-like mass. The industrial desirability of these properties will become apparent in the subsequent discussion of specific industrial applications.

The production of the starch acid-ester of substituted dicarboxylic acids involves treatment of the starch with a substituted cyclic dicarboxylic acid anhydride of the following structural formula:

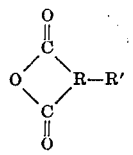

Substituted cyclic dicarboxylic acid anhydrides falling within this formula are the substituted succinic and glutaric acid anhydrides. In this formula, R represents a dimethylene or trimethylene radical and R' is the substituent hydrocarbon group. This substituent group R', which is a hydrophobic substituent, may be alkyl, alkenyl, aralkyl or aralkenyl. This substituent may contain from 1 to 18 carbon atoms. R' may be joined to the anhydride moiety R through a carbon-to-carbon bond (as in alkenyl succinic anhydride) or through two carbon-to-carbon bonds (as in the adduct of maleic anhydride with methyl pentadiene, or as in the cyclo-paraffinic cyclo-dicarboxylic acid anhydrides, such as, for example, cyclo-hexane 1,2-dicarboxylic acid anhydride), or may be linked through an ether or ester linkage (as, for example, in octyloxy succinic anhydride or in capryloxy succinic anhydride). Regardless of the particular linkage between the substituent R' and the anhydride proper, all of the above-listed types fall within the class of substituted dicarboxylic acid anhydrides, such as succinic or glutaric. In place of the organic acid anhydrides mentioned above, one may also use the substituted dicarboxylic acid chlorides of those dicarboxylic acids which form cyclic anhydrides, such as, for example, alkenyl succinic acid chloride.

The starch may be of any type, including corn, potato, tapioca, sago, rice, wheat, waxy maize, sweet potato, or arrowroot. For purposes of my present invention, however, the starch should be ungelatinized—that is, in the form of its original discrete granules, and should remain in this form throughout the process.

The above-mentioned copending application gives various procedures for bringing about the reaction between starch and the substituted anhydride, to form the acid ester. Thus, by one method, there is added to the starch, in aqueous suspension, a reagent selected from one of the above-described substituted cyclic dicarboxylic acid anhydrides. The pH of the suspension is preferably maintained between 7-11 during the reaction, which is ordinarily carried out at room temperature.

By another method, the reaction takes place in the dry state. Commercially dry starch (having a moisture content of approximately 5% to 20%) is blended with a dry alkaline material, such as trisodium phosphate or sodium carbonate, and with a substituted acid anhydride of the type described, the dry mixture preferably being heated to facilitate the reaction.

By still another method, the reaction takes place in suspension in an organic liquid, such as benzol, which is chemically inert to the starch and to the anhydride reagent. Thus, the starch may be suspended in benzol, with the subsequent addition of the anhydride reagent and sufficient pyridine (which is alkaline) to neutralize the reagent. The solvent may be removed, when the reaction is completed, by distillation or filtration.

The proportion of substituted cyclic dicarboxylic acid anhydride reagent to be used varies with the degree of substitution desired in the starch, and I have found that quantities ranging from 0.1% to 100%, based on the dry starch content, are effective. Since one is dealing here with the ungelatinized starch granule, it is understood that the maximum substitution possible is the replacement of all the hydroxyl groups on the surface region of the granule.

I wish to mention here that although the products formed by the reaction of starch with substituted succinic or glutaric anhydrides may herein be referred to as starch acid esters of substituted succinic or glutaric acids, in actual practice one most often obtains the alkali metal salt of the acid ester. This is caused by the fact that the reaction between the starch and the anhydride takes place, as has already been explained, in an alkaline medium, the most common alkali naturally being sodium hydroxide. Therefore, in such cases, the resulting starch acid ester would actually be in the form of its sodium salt. It should therefore be remembered that although, in this specification, I refer to the starch acid ester of substituted dicarboxylic acid, such as succinic or glutaric, I include within such term the alkali metal salt of such acid ester.

According to the preferred practice of my present invention, a starch acid ester of a substituted cyclic dicarboxylic acid, of the type already described, is suspended in water and there is dissolved therein a compound containing a polyvalent metal or alkaline earth metal ion. Among such compounds are the water-soluble salts of copper, mercury, aluminum, zirconium, iron (ferrous and ferric), chromium, tin, calcium, barium and strontium. The reaction is quite rapid and takes place at room temperature. The reaction has already been described as the substitution by the polyvalent metal or alkaline earth metal ion of the hydrogen atoms in the free carboxyl groups on the surface of the starch acid ester granule (or substitution of the alkali-metal ions, if one is dealing with the alkali-metal salt of the mono-ester). It is thus seen that the stoichiometric quantity of any given polyvalent metal salt can be estimated. I prefer to use an excess of the salt over the calculated stoichiometric quantity, and whereas the use of 0.1% of polyvalent metal or alkaline earth salt, based on the weight of the dry starch, has resulted in starch derivatives showing the improved characteristics herein described, I have also successfully employed amounts higher than 10%. Although employment of less than the stoichiometric quantities results in improved properties (but, naturally, to a lesser extent), for most applications one would want to use at least the full stoichiometric quantity of polyvalent metal or alkaline earth ion, in order to achieve maximum effectiveness.

After agitating the reaction suspension for several hours, in order to assure completion of the reaction, the starch product is filtered, washed with water and dried.

Variations of this method will suggest themselves. One such variation comprises the blending and distribution, in the dry state, of the starch acid ester with the polyvalent metal or alkaline earth compound, whereby the consumer subsequently initiates the reaction by adding water to the blend. Still another variation involves spraying a water solution of the polyvalent metal or alkaline earth compound into the dry starch acid ester, with agitation, thus effecting the reaction. It is understood that any such methods fall within the scope of my invention, so long as they effect a reaction between a starch acid ester of a substituted cyclic dicarboxylic acid of the type described, with a polyvalent metal or alkaline earth ion.

The unique properties of my products have caused them to be of great interest for many industrial applications, of which the following are cited merely by way of illustration:

*No-offset dry sprays.*—Especially because of its extremely free-flowing characteristic, wherein the individual starch granules remain at all times discrete and unattached to one another, my product is of value to the graphic arts industry, as a dry no-offset spray. This is the process wherein the dry starch powder is sprayed or dusted, by spray guns or other mechanical means, upon freshly printed surfaces, in order to prevent offset of the wet ink from one printed sheet to another. The free-flowing property of my starch derivative permits its efficient use in dry spray or dusting equipment, and it also forms a more even and uniform protective layer over the printed surface because of the absence of cluster formation among the starch particles.

*Insecticide powders.*—My product is an excellent carrier for insecticide powders. Many insecticides depend for their efficacy upon the actual penetration of the insecticide into the breathing apparatus, or other internal organs of the insect. Because the particles of my starch powder remain separate, discrete and free-flowing, these particles, when the insecticide is absorbed upon them, are exceptionally effective carriers. These same properties also facilitate penetration of the insecticide-starch powder into difficultly-reached places, such as thick vegetation, cracks and corners in walls and floors, etc.

Instead of using the starch derivative as a carrier for insecticides, it is possible, in my process, by proper choice of the polyvalent ion, to produce a starch derivative which itself has insecticidal or rodenticidal properties. It is known that certain ions such, for example, as mercury, ordinarily impart toxicological properties. The formulator skilled in the art will therefore choose the particular metallic or alkaline earth ion to be used in my process, in the light of the particular added properties (besides free flow and non-wettability) which he may wish to obtain.

*Delustering cellulose acetate rayons.*—The threads of which these fabrics are comprised are made by extruding a solution of cellulose acetate in organic solvent from tiny apertures in a spinneret. It is often desirable that the thread, and consequently the eventual fabric, be free of high luster, but rather have a soft, satiny appearance. This is accomplished by adding the starch powder of my invention to the solution in the spinneret, where it is easily suspended because of its wettability by organic solvent. The threads and fabrics thus formed are characterized by a smooth, satiny appearance, without high luster.

*Delustering lacquers.*—Similarly, the starch powder of my invention, when mixed with lacquer-type paints and coatings, tends to reduce gloss and to impart a soft, satiny finish.

*Rubber finishing.*—Newly made rubber products are often dipped in an organic solvent, such as naphtha, to which has been added starch. The purpose of the starch is twofold—to produce a smooth, satiny finish on the surface of the rubber after the solvent has evaporated, and to remove any residual tackiness, thus preventing the sticking of the finished rubber products one to the other. However, ordinary starch does not easily form a homogeneous suspension in organic solvents such as naphtha but, instead, frequently agglomerates into clumps which sink to the bottom. This, of course, destroys the usefulness of the starch for the stated purpose. On the other hand, my product, because of its easy wettability by organic solvents, quickly forms a homogeneous suspension upon mixing in such fluids, without agglomeration into clumps and separation from the liquid. Thus, it is of real value as a replacement for ordinary starch in such processes.

*Textile sizing and finishing.*—If the starch powder of my invention is first wetted with a water-miscible organic solvent, it may immediately thereafter be suspended in water and cooked to form a homogeneous, gelatinized mass, which is of great interest for water-resistant textile sizes and finishes. This is of particular value because the fabric need only be treated with the size or finish in the usual way, without need for subsequent additional treatments to bring about water-repellency.

Here too, the judicious choice of the polyvalent metallic ion to be used in my process can impart certain additional advantageous properties. Thus, for example, the use of copper as the metallic ion will result in a textile finish showing marked mildew resistant characteristics.

Volume for volume, my starch powder has a higher density than ordinary starches. In other words, a given weight of my starch occupies considerably less volume than other starches. This property not only offers obvious advantages and economies in packaging and shipping, but together with the other heretofore described unique characteristics, will undoubtedly suggest many other industrial applications.

The following examples will further illustrate the embodiment of my invention:

*Example I*

A starch acid ester of substituted succinic acid was prepared by suspending 100 parts corn starch in 150 parts water, in which there had been dissolved 5 parts sodium carbonate. While the suspension was agitated, there were added slowly 5 parts of decenyl succinic acid anhydride. Agitation was continued for 14 hours, at room temperature, after which the pH was adjusted to 7.0, using dilute hydrochloric acid, and the starch derivative was filtered and washed with water.

The starch acid ester thus formed was then resuspended in 100 parts water, with agitation, and 2 parts of aluminum sulphate were dissolved therein. After 4 hours agitation, at room temperature, the starch derivative was filtered, washed with water and dried. The dry starch derivative, which was still in the form of its original ungelatinized granules, was characterized by the remarkable properties already described, including an almost fluid-like freedom of flow, a strong resistance to wetting by water, combined with the ability to be wetted by organic solvents.

Example II

A starch acid ester of a substituted glutaric acid was prepared by suspending 100 parts tapioca starch in 125 parts water in which 8 parts sodium carbonate had been dissolved. There were added slowly, with agitation, 10 parts of heptyl glutaric acid anhydride. Agitation was maintained for 18 hours, whereupon the pH was adjusted to 7.0, the starch filtered and washed with water.

The thus-formed starch derivative was re-suspended in 100 parts water, with agitation, and 10 parts ferrous sulphate were dissolved therein. Agitation was maintained overnight, whereupon the starch derivative was filtered, washed and dried.

This example was repeated, replacing the ferrous sulphate by the same quantity of ferric sulphate. In both cases, the products thus formed exhibited improved properties similar to those described in Example I.

Example III

A starch acid ester of substituted succinic acid was prepared by suspending 100 parts rice starch in 200 parts water, which had been brought to pH 7.5 by addition of sodium hydroxide. There was then added, with continuous agitation, 5 parts triisobutylene succinic anhydride. After approximately 7 hours agitation, during which the pH was maintained at 7, the starch derivative was filtered and washed with water.

The starch derivative thus formed was re-suspended in 200 parts water and 2 parts aluminum sulphate dissolved therein. After 6 hours agitation, the starch derivative was filtered, washed and dried.

The product thus formed exhibited improved properties similar to those described in Example I.

Example IV

A starch acid-ester of substituted succinic acid was prepared by suspending 100 parts of an acid-converted, thin-boiling corn starch (of a degree of conversion known in the trade as 60 fluidity) in 300 parts water, in which there had been dissolved 6 parts of sodium carbonate. With continuous agitation, there were then added 5 parts of triisobutenyl succinic acid anhydride. Agitation was continued for approximately 14 hours, followed by neutralization, filtration and washing.

The starch acid-ester thus formed was re-suspended in 200 parts water, with agitation, and 0.1 part of stannic chloride was dissolved therein. Although, as has already been stated, the reaction proceeds quite rapidly, it was found convenient to permit agitation to continue overnight. Thereupon, the starch derivative was filtered, washed and dried.

The product thus formed exhibited improved properties similar to those described in Example I.

Example V

A starch acid-ester of substituted succinic acid was prepared, using the same materials, proportions and procedure as described in Example IV.

The starch acid-ester thus formed was re-suspended in 300 parts water, with agitation, and 3 parts calcium formate were dissolved therein. Agitation was continued for 7 hours, whereupon the starch derivative was filtered, washed and dried.

This example was repeated, replacing the calcium formate with the same quantity of barium chloride.

This example was again repeated, replacing the calcium formate with strontium nitrate. In all cases, the products formed were characterized by improved properties of the type already described.

Example VI

A starch acid-ester of substituted succinic acid was prepared by suspending 100 parts of potato starch in 300 parts water, in which had been dissolved 3 parts sodium carbonate. There were then added, with agitation, 5 parts octadecenyl succinic acid chloride. After approximately 5 hours' agitation, the reaction mass was neutralized and the starch derivative filtered and washed.

The starch derivative thus formed was re-suspended in 300 parts water and 3 parts copper sulphate were dissolved therein. After 3 hours' agitation, the starch derivative was filtered, washed with water and dried.

The product thus formed exhibited improved properties similar to those described in Example I.

Example VII

A starch acid-ester of substituted succinic acid was prepared, by a dry process, by blending 100 parts of air-dry waxy maize starch with 6 parts of sodium carbonate, and spraying into this blend, with continuous agitation, 10 parts of octenyl succinic acid anhydride. The anhydride had previously been thinned by mixing with sufficient toluene to produce a liquid suitable for spraying. The resulting starch blend was agitated for 3 days, maintaining the temperature within the range 90°–100° F. Sufficient heat was then applied to the starch derivative to drive off residual toluene.

The starch acid-ester thus formed was then suspended in 300 parts water, with agitation, the pH adjusted to 6.5, and 16 parts ceric sulphate were dissolved therein. After 5 hours' agitation the starch produced was filtered, washed and dried.

The product thus formed exhibited improved properties similar to those described in Example I.

Example VIII

A starch acid-ester of substituted succinic acid was prepared by suspending 100 parts of wheat starch in 200 parts of water, adjusting the pH to approximately 10 by the addition of a 3% solution of sodium hydroxide, and adding slowly, with continuous agitation, 20 parts of capryloxy succinic acid anhydride (maintaining the pH between 7 and 10 by the addition, as necessary, of 3% sodium hydroxide solution). After 10 hours' agitation, the starch derivative was filtered and washed.

The starch acid-ester was then re-suspended in 300 parts water, containing dissolved therein one part of chromic chloride. After 3 hours' agitation, the starch derivative was filtered, washed with water and dried.

The product thus formed exhibited improved properties similar to those described in Example I.

Example IX

A starch acid-ester of substituted succinic acid was prepared by suspending 100 parts corn starch in 300 parts water in which 1 part sodium carbonate had been dissolved, and adding thereto, with agitation, 0.1 part octenyl succinic acid anhydride, dissolved in acetone. After 7 hours' agitation the starch derivative was filtered and washed.

The starch acid-ester thus formed was re-suspended in 200 parts water, and 3 parts aluminum sulphate were dissolved therein. Agitation was continued for 5 hours, whereupon the starch derivative was filtered, washed and dried.

The product thus formed exhibited improved properties similar to those described in Example I.

Example X

A starch acid-ester of succinic acid was prepared, by the organic liquid suspension method, by suspending 100 parts potato starch in 200 parts benzol, and adding to this suspension, with agitation, 7 parts nonenyl succinic acid anhydried, together with pyridine (a basic organic liquid) in the ratio 2 mols pyridine to 1 mol of the acid anhydride. After 10 hours' agitation, the solvent was removed by distillation.

The resulting starch acid-ester was mixed with 200 parts water, and 5 parts of zinc chloride were dissolved in this aqueous suspension. After 4 hours of agitation, the starch derivative was filtered, washed with water and dried.

The product thus formed exhibited improved properties similar to those described in Example I.

Example XI

A starch acid-ester of substituted succinic acid was prepared by suspending 100 parts corn starch in 300 parts water, adjusting the pH to approximately 7.5 by the use of a 3% solution of sodium hydroxide, and adding slowly, with continuous agitation, 5 parts of methylene succinic acid anhydride (maintaining the pH at about 7.5 by the addition, as necessary, of 3% sodium hydroxide solution). After 10 hours' agitation, the starch derivative was filtered and washed.

The starch acid ester thus formed was re-suspended in 200 parts water, and 5 parts aluminum sulphate were dissolved therein. Agitation was continued for 5 hours, whereupon the starch derivative was filtered, washed and dried.

The product thus formed exhibited improved properties similar to those described in Example I.

I claim:

1. A free-flowing ungelatinized starch derivative comprising the product of an ungelatinized starch acid-ester of a substituted dicarboxylic acid of the following formula:

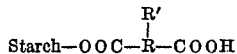

wherein R is a radical from the group of dimethylene and trimethylene radicals and R' is a hydrocarbon substituent from the class consisting of an alkyl, alkenyl, aralkyl, and aralkenyl, reacted with a compound containing a polyvalent metal ion.

2. The method of making a free-flowing ungelatinized starch derivative which consists in reacting an ungelatinized starch in an alkaline medium with a substituted cyclic dicarboxylic acid anhydride having the following formula:

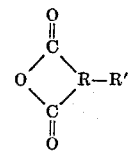

wherein R is a radical from the class of dimethylene and trimethylene radicals and R' is the substituent group from the class consisting of an alkyl, alkenyl, aralkyl, and aralkenyl, and thereby producing an ungelatinized starch acid-ester of a substituted dicarboxylic acid anhydride, and then reacting said starch acid-ester with a compound containing a polyvalent metal ion.

3. The method of claim 2 in which the metal ion containing compound is a water-soluble salt.

4. The method of making a free-flowing ungelatinized starch derivative which consists in reacting an ungelatinized starch acid-ester of a substituted dicarboxylic acid of the following formula:

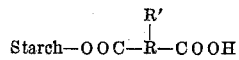

wherein R is a radical from the group of dimethylene and trimethylene radicals and R' is a hydrocarbon substituent from the class consisting of an alkyl, alkenyl, aralkyl and aralkenyl, with a compound containing a polyvalent metal ion.

5. A free-flowing ungelatinized starch derivative comprising the product obtained by the method of claim 2.

CARLYLE G. CALDWELL.

REFERENCES CITED

The following references are of record in the file of this patent:

UNITED STATES PATENTS

| Number | Name | Date |
|---|---|---|
| 2,040,093 | Malm et al. | May 12, 1936 |
| 2,225,589 | Haussmann et al. | Dec. 17, 1940 |
| 2,461,139 | Caldwell | Feb. 8, 1949 |